United States Patent
Joppek et al.

(10) Patent No.: US 8,688,167 B2
(45) Date of Patent: Apr. 1, 2014

(54) MOBILE PHONE DEVICE WITH SEVERAL SIM CARDS

(75) Inventors: Franz-Josef Joppek, Rheinberg (DE); Jörg Franke, Düsseldorf (DE); Christoph Stepping, Olpe (DE)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 12/761,220

(22) Filed: Apr. 15, 2010

(65) Prior Publication Data

US 2010/0279737 A1    Nov. 4, 2010

(30) Foreign Application Priority Data

Apr. 22, 2009   (DE) .......................... 10 2009 018 195

(51) Int. Cl.
*H04M 1/00*   (2006.01)
(52) U.S. Cl.
USPC .......................... 455/551; 455/552.1; 455/558
(58) Field of Classification Search
USPC ....................... 455/551, 552.1, 558
See application file for complete search history.

(56) References Cited

U.S. PATENT DOCUMENTS

| | | | |
|---|---|---|---|
| 6,317,593 B1* | 11/2001 | Vossler ...................... | 455/414.1 |
| 6,398,572 B1* | 6/2002 | Larsson ........................ | 439/327 |
| 6,602,096 B1* | 8/2003 | Kronestedt et al. ........... | 439/630 |
| 8,180,400 B2* | 5/2012 | Shin et al. ...................... | 455/558 |
| 2002/0154632 A1* | 10/2002 | Wang et al. .................... | 370/389 |
| 2003/0199289 A1* | 10/2003 | Kao et al. ................... | 455/575.1 |
| 2006/0089171 A1* | 4/2006 | Yoo et al. ...................... | 455/557 |
| 2007/0218946 A1* | 9/2007 | Kim .............................. | 455/558 |
| 2009/0029736 A1* | 1/2009 | Kim et al. ..................... | 455/558 |

FOREIGN PATENT DOCUMENTS

| | | |
|---|---|---|
| DE | 102005026258 A1 | 12/2006 |
| EP | 1094678 A1 | 4/2001 |
| WO | WO99/45730 A1 | 9/1999 |

* cited by examiner

*Primary Examiner* — Raymond Dean (74) *Attorney, Agent, or Firm* — International IP Law Group, PLLC (57) ABSTRACT

There is provided a mobile telephony device, comprising a mobile station that can be connected to a mobile telephony network by using a SIM card. A multiplexer can be connected to the mobile station, the multiplexer holding several SIM cards. An exemplary multiplexer may comprise a first switching component that is configured such that each one of the SIM cards can be connected to the mobile station. The exemplary multiplexer may comprise a second switching component that is configured to switch off the mobile station while one SIM card is being disconnected from the mobile station and another SIM card is being connected to the mobile station.

13 Claims, 4 Drawing Sheets

MOBILE PHONE DEVICE WITH SEVERAL SIM CARDS

CROSS REFERENCE TO RELATED APPLICATION

This application claims priority to German (DE) Patent Application No. 10 2009 018 195.4, filed Apr. 22, 2009, the contents of which are hereby incorporated by reference as if set forth in their entirety herein.

BACKGROUND

Mobile telephony terminal devices such as, for example, mobile telephones, are normally operated with SIM cards that are inserted interchangeably into the mobile telephony terminal devices. The SIM cards contain especially the identity of the user and serve to identify the user in a mobile telephony network and to check his/her authorization to use services of the mobile telephony network. As a rule, a SIM card is issued by the operator of the home network of a user, with whom the user has entered into a mobile telephony contract. Within the home network, the user is also listed in a register (HLR—Home Location Register). During so-called roaming, when the users sign in to a mobile telephony network they are visiting, i.e. into a mobile telephony network different from their home network, the register of the home network is likewise accessed so that the identity and authorization of the user can be checked.

In mobile telephony systems, it is common practice to regularly check the service quality. Of special interest here is the service quality when the services of the home network are used. In this process, the service quality in various mobile telephony networks is compared to each other. Such comparative tests call for the use of several SIM cards that have been issued by the operators of the mobile telephony networks that are to be compared. Moreover, the service quality that is provided in a certain mobile telephony network during roaming connections is often of interest, that is to say, when this mobile telephony network is used as the visited mobile telephony network. In order to check the service quality for users of different home networks, it is necessary to use the SIM cards that were issued by the operators of these home networks at the time of the signing in.

European patent application EP 1 094 678 A1 discloses a method for measuring the quality of roaming connections and an arrangement for carrying out the method. This known method uses at least two test stations to generate test calls via the mobile telephony network and/or to receive calls from the mobile telephony network. The data of the SIM cards needed to carry out the test calls is transmitted from a SIM card server device to the test stations. The service device is suited for accommodating a plurality of SIM cards. The infrastructure that is needed to carry out the known method is relatively complex.

SUMMARY OF THE INVENTION

The invention relates to a mobile telephony device, comprising a mobile station that can be connected to a mobile telephony network by using a SIM card. Moreover, the invention relates to a system comprising the mobile telephony device for checking the service quality in at least one mobile telephony network.

Exemplary embodiments of the present invention relate to a device that allows a simpler utilization of several SIM cards. In particular, the device is intended to simplify the above-mentioned checks of the service quality in one or more mobile telephony networks.

A device according to an exemplary embodiment of the invention may comprise a mobile station that can be connected to a mobile telephony network by using a SIM card. Moreover, the exemplary device comprises a multiplexer that can be connected to the mobile station and that holds several SIM cards, whereby the multiplexer has a first switching means through which each one of the SIM cards can be connected to the mobile station. The exemplary mobile telephony device also comprises a second switching component that is configured to switch off the mobile station while one SIM card is being disconnected from the mobile station and another SIM card is being connected to the mobile station.

A potential advantage of the device according to an exemplary embodiment of the invention lies in the fact that several SIM cards can be used by a single mobile station. This is enabled by a multiplexer that makes it possible to switch from one employed SIM card to another employed SIM card. Therefore, this creates an especially simple device for using several SIM cards.

During the change of the SIM cards, the mobile station of the device according to an exemplary embodiment of the invention is preferably switched off. In particular, the mobile station is switched off before a SIM card is disconnected from the mobile station. In this manner, a switch-off routine is executed that ensures that the SIM card connected to the mobile station is securely switched off. This takes advantage of the fact that such a secure switch-off routine is normally executed as a standard procedure whenever a mobile station is switched off. If the SIM card were disconnected from the mobile station during ongoing operation, this could cause damage to the SIM card. The reason for this is that, during such a disconnection of a SIM card from the mobile station, this could be interpreted as a manipulation attempt, which would cause the SIM card to block itself or make itself unusable.

As used herein, the term SIM card refers to a chip card that contains a subscriber identification module and that can be used to identify a mobile telephony subscriber vis-á-vis a mobile telephony network. This can be a SIM card according to the GSM standard (GSM: Global System for Mobile Communications). By the same token, however, the term also intended to be broad enough to encompass chip cards of the kind that are used in other mobile telephony networks or that are configured according to other standards.

In one exemplary embodiment of the invention, it is provided that the mobile station has a card holder to hold the SIM card and that the multiplexer has a connection piece that can be inserted into the card holder, whereby the SIM cards can each be connected to the connection piece via a first switching component. Advantageously, in this exemplary embodiment, a card holder of the mobile station that is provided as a standard feature can be used to hold SIM cards in order to connect the mobile station to one of the SIM cards that has been inserted into the multiplexer. The mobile station does not have to have a special interface in order to be connected to the multiplexer.

A related exemplary configuration of the mobile telephony device provides that the connection piece has the outer dimensions of a SIM card and has contact surfaces that are arranged like contact surfaces on a SIM card. Advantageously, such a connection piece can be inserted into the card holder of the mobile station in the same way as a SIM card.

As already mentioned above, a SIM card is preferably only disconnected from the mobile station once the mobile station has already been switched off. Consequently, one exemplary embodiment of the mobile telephony device may comprise a control unit that is configured to disconnect the connection between a SIM card and the mobile station through the first switching component that is associated with the SIM card after the mobile station has been switched off through the second switching component.

In a related configuration of an exemplary mobile telephony device a predefinable time interval passes between the point in time when the mobile station is switched off and the point in time when the connection between the SIM card and the mobile station is disconnected. The time interval may be selected in such a way that it is sufficiently long for the switch-off routine to be executed so as to securely switch off the SIM card.

Preferably, the control unit may also be configured to switch on the mobile station through the second switching component after a SIM card has been connected to the mobile station through the associated first switching component. Thus, the mobile station can be switched on again by the control unit after the SIM card has been changed, and it can then be used with the new SIM card.

In an exemplary embodiment, the mobile telephony device has a first interface for receiving control signals for influencing the control unit. This especially makes it possible to transmit external control commands to the control unit. In particular, for example, the change of the SIM card can be controlled or triggered on the basis of such control commands.

Moreover, an exemplary embodiment of the mobile telephony device may comprise a second interface for establishing a data connection to the mobile station. In this manner, an external unit can access the mobile station. The external unit can control, for example, functions of the mobile station and can be connected to a mobile telephony network via the mobile station.

In one exemplary embodiment, the first and/or the second interface of the mobile telephony device is configured as a USB interface. This is especially advantageous when the mobile telephony device is to be connected to a computer device. In this case, the connection can be configured as a USB connection that allows very easy access to the mobile telephony device (USB: Universal Serial Bus).

According to another exemplary embodiment, a system for checking the service quality in at least one mobile telephony network is put forward. The exemplary system comprises a mobile telephony device of the type described above and a computer device that is connected to the mobile telephony device and that is configured to access a service of the mobile telephony network via the mobile station. Here, the computer device preferably contains one or more applications for controlling and evaluating the checking of the service quality in the mobile telephony network.

In one exemplary embodiment of the system, the computer device is connected via the first interface of the mobile telephony device to the control unit of the mobile telephony device and it is configured to trigger a switchover from one SIM card to another SIM card on the basis of a control command.

DETAILED DESCRIPTION OF SPECIFIC EMBODIMENTS

Figure 1:
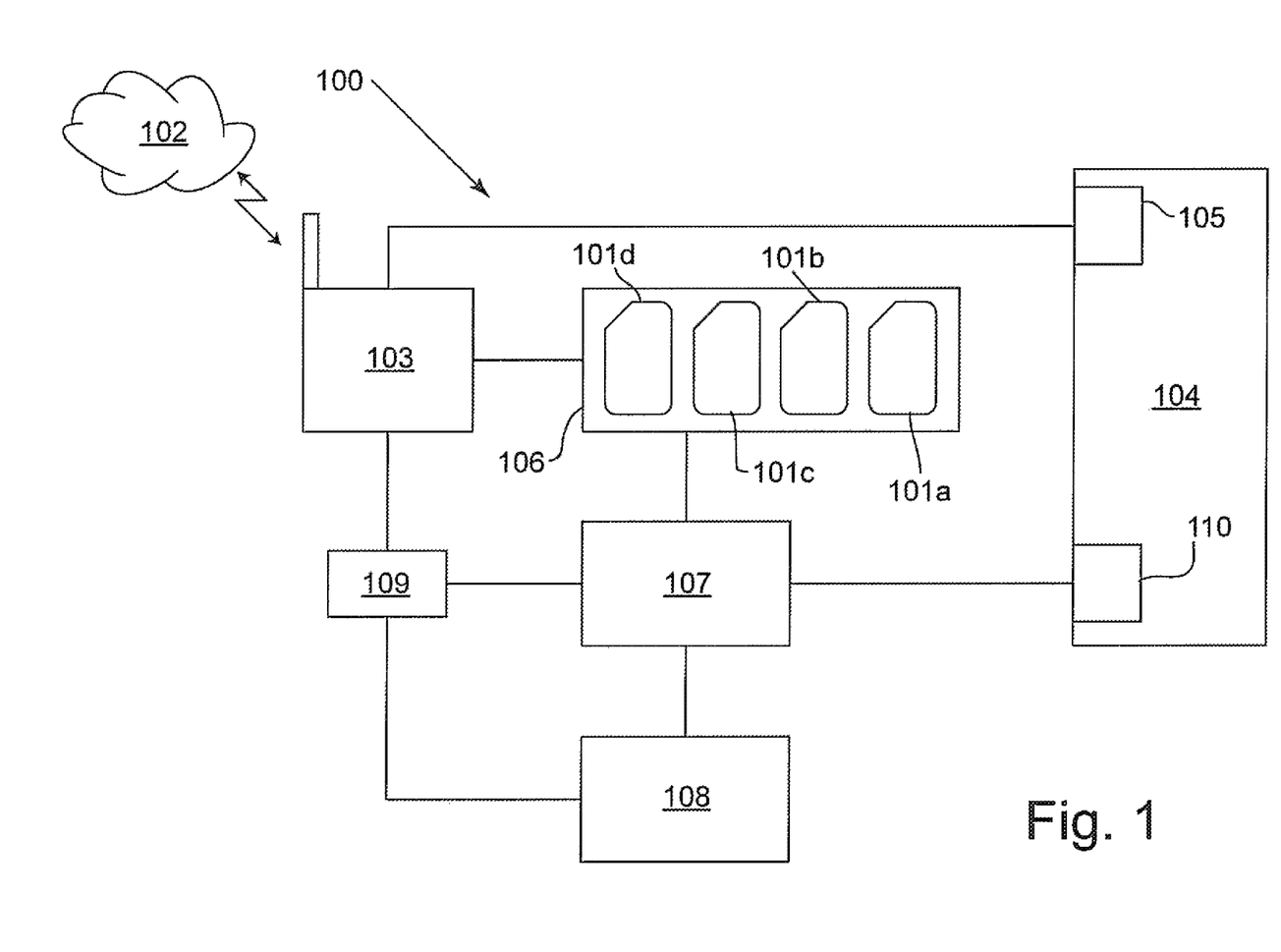
FIG. 1 is a schematic block diagram of a mobile telephony device configured according to an exemplary embodiment of the present invention.

FIG. 1 schematically shows a system 100 that can be connected to one or more mobile telephony networks 102 and that, for this purpose, has several SIM cards 101a to 101d. The mobile telephony networks 102, one of which is shown in FIG. 1 by way of an example, are configured in a generally known manner, for example, according to the GSM or UMTS standards (UMTS: Universal Mobile Telecommunications System). The system 100 shown in the figure can especially be used to check the service quality in the mobile telephony networks 102, and it makes it possible to carry out the checking operations using several SIM cards 101a to 101d. In this manner, it is possible to compare the service quality in several mobile telephony networks 102 when these are used as home networks, and also to check the service quality during roaming connections in one or more mobile telephony networks 102.

The system 100 comprises a mobile station 103 by which telephony connections in mobile telephony networks 102 can be established. For this purpose, the mobile station 103 has a telephony module and a microcontroller for controlling the functions of the telephony module. In one embodiment, which is especially practical for checking the service quality in mobile telephony networks 102, the mobile station 103 is configured as a supplementary module for a computer device 104. In this case, the computer device 104 accesses functions of the mobile station 103, and the mobile station 103 is controlled by the computer device 104. For example, the mobile station 103 can be a USB device that is connected to the computer device 104 via a USB interface 105. Such USB devices are known to the person skilled in the art, for instance, by the name USB mobile telephony stick. By the same token, however, the mobile station 103 can also be configured in a different manner, for example, as a PCMCIA card that is connected via an appropriate connector to the computer device 104 (PCMCIA: Personal Computer Memory Card International Association). In further embodiments, the mobile station 103 can also be configured as an essentially independent, integrated device that has the requisite components to provide its functions directly to a user. In this case, the mobile station 103 also has, in particular, input and output components for interaction with the user. Such a mobile station 103 can be configured, for example, as a mobile telephone, a PDA (Personal Data Assistant) or as a similar device.

The power for the system shown in FIG. 1 is provided by a power supply unit 108 that can be configured, for instance, as a battery or as a power pack that can be connected to a supply network. The power supply unit 108 can especially be used to supply power to the mobile station 103. In this manner, the power supply is independent of other power sources such as, for instance, the power supply via the USB interface 105 of the computer device 104. This has the advantage that power can be supplied independently of the limitations of the USB interface 105, which only allows a limited current strength.

Portable computer devices 104 entail the advantage that the limited capacity of the energy sources of the computer device are not additionally burdened to supply the mobile station 103. In alternative embodiments, however, the mobile station 103 can also be supplied with power in another manner, for example, via the USB interface 105, via another interface of the computer device 104 or by via an internal power source.

In order to connect the mobile station 103 to a mobile telephony network 102 and in order to be able to access services of the mobile telephony network 102, the mobile station 103 is connected to a SIM card 101a to 101d. For this purpose, the mobile station 103 has a card holder configured as a card reader into which a SIM card 101a to 101d can be inserted.

SIM cards 101a to 101d are configured as chip cards that contain a subscriber identification module of the type known to the person skilled in the art. It is especially used to identify and authenticate a mobile telephony user vis-á-vis the mobile telephony network 102. If the mobile telephony network 102 is configured according to the GSM standard, then the subscriber identification module is a SIM (Subscriber Identification Module) according to the GSM standard. If the mobile telephony network 102 is a UMTS network, then the subscriber identification module is configured as a USIM (Universal Subscriber Identification Module). As a rule, appropriate subscriber identification modules are provided in the case of mobile telephony networks 102 that work according to another mobile telephony standard.

The term SIM card is used herein for chip cards that comprise any kind of subscriber identification module that can be employed to identify a mobile telephony user vis-á-vis a mobile telephony network 102. Consequently, aside from chip cards with subscriber identification modules according to the GSM standard, the term also refers to chip cards with other subscriber identification modules.

A SIM card 101a to 101d is normally issued by the operator of a mobile telephony network 102 with which a mobile telephony user has signed a contract. The mobile telephony network 102 of this operator, with whom the SIM card 101a to 101d is associated, is also referred to as the home network of the mobile telephony user. Within the home network, the mobile telephony user is registered in a register that is usually referred to as an HLR (Home Location Register). As a rule, a mobile telephony user is given access to the home network without any further restrictions whenever the mobile telephony network 102 is available. The services of the home network that can be used by a mobile telephony user depend on the mobile telephony contract that he/she has signed with the operator of the home network. With such a contract, unlimited access to the services offered in the home network can be permitted. When the mobile telephony user signs in to a visited mobile telephony network 102 that differs from his/her home network, the user identification and authentication are likewise carried out on the basis of the SIM card 101a to 101d of the mobile telephony user querying the HLR of the home network. The services that a mobile telephony user can access in a visited mobile telephony network 102 are especially determined by an agreement that has been made between the operator of the visited mobile telephony network 102 and the operator of the home network. If no such agreement exists, then the mobile telephony user is normally refused access to the mobile telephony network 102.

In order to avoid fraudulent access to a SIM card 101a to 101d, a security architecture is provided that prevents unauthorized access to data and functions of the subscriber identification module. The security architecture normally comprises mechanisms for recognizing manipulation attempts. If such a manipulation attempt is recognized, the SIM card 101a to 101d can be, for example, blocked or even rendered permanently unusable in order to prevent advantages from being acquired through such a manipulation. In particular, when the connection between the SIM card 101a to 101d and the mobile station 103 is disconnected in an unforeseen manner, this is normally interpreted as a manipulation attempt. This prevents the execution of command sequences in the SIM card 101a to 101d and/or the transmission of command sequences to the SIM card 101a to 101d from being interrupted in a targeted manner in order to benefit from this with fraudulent intent. Consequently, switching off a SIM card 101a to 101d calls for a prescribed switch-off procedure that comprises especially the announcement of an impending switch-off procedure by the mobile station 103. In particular, the switch-off procedure is carried out when the mobile station 103 is switched off, and this normally also causes the SIM card 101a to 101d connected to the mobile station 103 to be switched off.

A plurality of SIM cards 101a to 101d that can be selectively connected to the mobile station 103 are provided in the system 100. In this manner, the mobile station 103 can be connected to several home networks, and/or roaming connections in a mobile telephony network 102 can be established by making use of several SIM cards 101a to 101d. The SIM cards 101a to 101d are contained in a multiplexer 106 that comprises four different SIM cards 101a to 101d in the depiction shown in FIG. 1 by way of an example. However, the exemplary embodiments of the invention are not limited to a multiplexer 106 for four SIM cards 101a to 101d, but rather, the multiplexer 106 can contain fewer as well as more SIM cards 101a to 101d.

Figure 2:
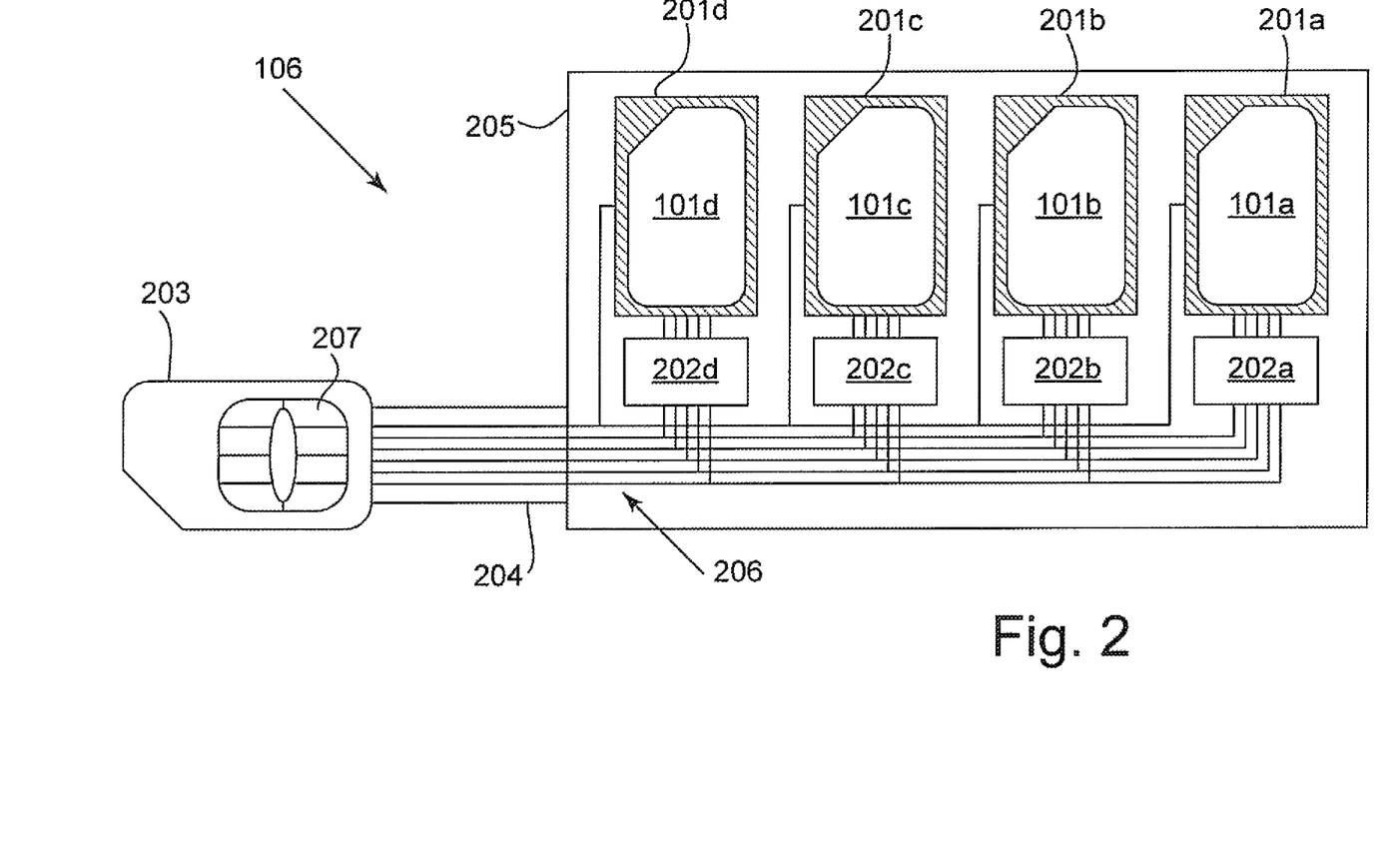
FIG. 2 is a schematic block diagram of an exemplary embodiment of a multiplexer of the device shown in FIG. 1.

FIG. 2 shows the multiplexer 106 of FIG. 1 in greater detail. The multiplexer 106 has several holders 201a to 201d to hold SIM cards 101a to 101d into which the SIM cards 101a to 101d can be inserted. Each SIM card 101a to 101d can be selectively connected using an associated switch 202a to 202d to a contact piece 203 that has the same external dimensions and the same contact surfaces 207 (only numbered by way of example) as a SIM card 101a to 101d. The contact piece 203 is inserted into the card reader of the mobile station 103, so that the mobile station 103 can have access to one of the SIM cards 101a to 101d inserted into the multiplexer 106. Via the contact piece 203, the contacts of the selected SIM card 101a to 101d are then connected to the corresponding contacts of the card reader of the mobile station 103. The switches 202a to 202d are actuated by a controller 107 that comprises, for example, a microprocessor. The controller 107 may be integrated into a housing together with the multiplexer 106.

The contact piece 203 is connected via a flexible printed circuit board 204 to a printed circuit board 205 on which the SIM cards 101a to 101d are arranged. The contact surfaces 207 of the contact piece 203 are each connected to a SIM card 101a to 101d via a conductor bundle 206, which also passes through the flexible printed circuit board 204 and whose conductors are each associated with one of the relevant contacts of the SIM cards 101a to 101d.

A SIM card 101a to 101d has, for example, eight contacts that are normally referred to as C1 to C8. Contacts C4 and C8 are auxiliary contacts that are not used in mobile telephony. A SIM card 101a to 101d is supplied with power via contact C1 with the designation VCC. Contact C2 with the designation RST serves as the input for a reset signal, contact C3 with the designation CLK serves as the input for a clock signal, contact C5 with the designation GND is the ground contact, contact C6 with the designation VPP can be used to provide programming power and contact C7 with the designation I/O serves as the input and output for the serial communication between the mobile station 103 and the SIM card 101*a* to 101*d*. Via the conductor tracks of the conductor bundle 206, these contacts of a SIM card 101*a* to 101*d* that has been inserted into the multiplexer 106 can be connected to the contacts 207 of the contact piece 203. The contacts of the SIM card 101*a* to 101*d* are each connected to the contacts 207 of the contact piece 203 whose positions correspond to the positions of the contacts on the SIM card 101*a* to 101*d*.

Figure 3:
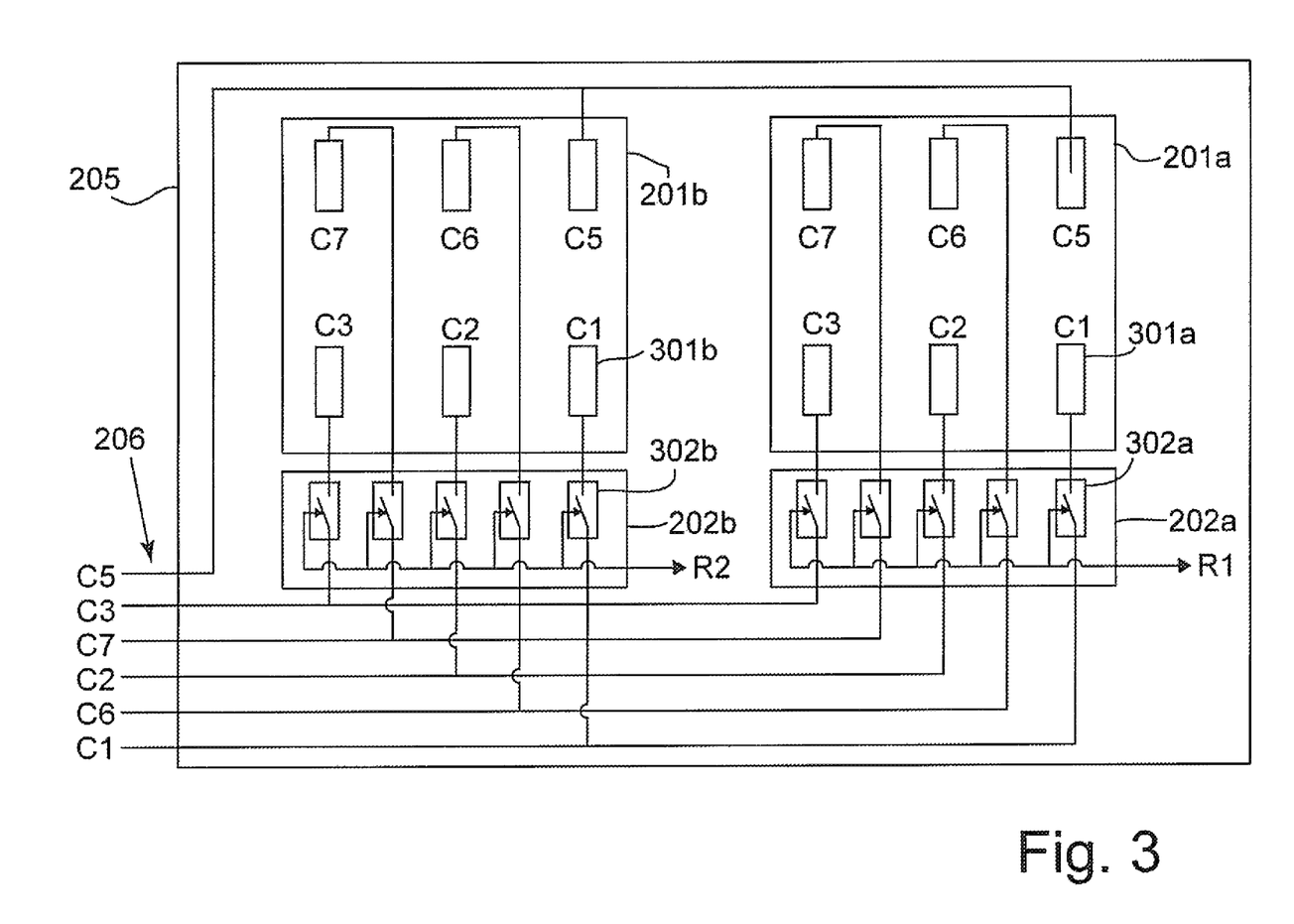
FIG. 3 is a schematic circuit diagram of an exemplary embodiment of the multiplexer shown in FIG. 1.

A schematic circuit diagram of a section of the printed circuit board 205 of the multiplexer 106 is shown in FIG. 3. By way of example, the section comprises two holders 201*a,b* for the SIM cards 101*a,b*. The other holders 201*c,d* are wired in the same way. Each holder 201*a,b* has contact surfaces 301*a,b* (each only numbered by way of example) for contacting the relevant contacts C1, C2, C3, C5, C6 and C7 of the inserted SIM card 101*a,b*. With the exception of the contact surface 301*a,b* that corresponds to the ground contact C5, the contact surfaces 301*a,b* of a holder 201*a,b* can be connected to the conductors of the conductor bundle 206 via the associated switches 202*a,b* so that the contact surfaces of a SIM card 101*a* to 101*d* are connected to the corresponding contact surfaces of the contact piece 203. The switches 202*a,b* each have switching component 302*a,b* (each only numbered by way of example) which, in the closed state, connect the contact surfaces 301*a,b* of the holders 201*a,b* to the conductors of the conductor bundle 206. In the open state of the switching component 302*a,b*, the connections are disconnected. The switching component 302*a,b* are configured, for example, as a relay, especially as a semiconductor relay. The switches 202*a,b* or the switching component 302*a,b* contained in the switches 202*a,b* are controlled via control lines that are connected to the controller 107 via control connections R1, R2. The ground contacts C5 of the SIM cards 101*a,b* are connected directly, that is to say, not via a switch 202*a,b*, to the appertaining contact surface 207 of the contact piece 203, since there is no need for switching the ground connection.

The controller 107 can be arranged on the printed circuit board 205 of the multiplexer 106. By the same token, a separate arrangement is possible, but preferably in the same housing. In addition to actuating the switches 202, the controller 107 can switch the mobile station 103 on and off. For this purpose, in an embodiment by way of an example, the controller 107 controls the power supply of the mobile station 103. In order to switch on the mobile station 103, the mobile station 103 is connected to the power supply that supplies it. In order to switch off the mobile station 103, the mobile station 103 is disconnected from the power supply that supplies it. In the system 100 shown by way of an example in FIG. 1, in which the mobile station 103 is supplied by the power supply unit 108, a switching device 109 is provided for this purpose via which the mobile station 103 is connected to the power supply unit 108 and actuated by the controller 107. In alternative embodiments, the mobile station 103 can also be switched off in other ways. In particular, the switch-off procedure of the mobile station 103 can be initiated through actuation by the controller 107. This can be, for example, the switch-off procedure that is carried out whenever a switch of the mobile station 103 is manually actuated in order to switch it off.

In the system 100 shown in FIG. 1, the controller 107 is connected to the computer device 104. Like the connection to the mobile station 103, the connection to the controller 107 can likewise be established, for example, via a USB interface 110 of the computer device 104. In the embodiment shown, by actuating the controller 107 using the computer device 104, the change can be made from one SIM card 101*a* to 101*d* to another SIM card 101*a* to 101*d*. In other embodiments, another control panel for actuating the controller 107 can also be provided. For example, the control panel can be an input and display device that is arranged on the housing in which the multiplexer 106 and the controller 107 are arranged. As an alternative, the controller 107 can also be connected to the mobile station 103 via a suitable interface and can be actuated by the mobile station 103. The latter can especially be provided if the mobile station 103 has input and display devices such as is the case, for example, with a mobile telephone or a PDA.

In order to change the SIM card 101*a* to 101*d* used by the mobile station 103, first of all, the mobile station 103 is switched off. For this purpose, the controller 107 disconnects the mobile station 103 from the power supply unit 108 by opening the switching device 109. The switching off of the mobile station 103 causes a switching-off procedure to be executed for purposes of securely switching off the previously employed SIM card 101*a* to 101*d*. The power supply for executing the switching-off procedure comes, for example, from the capacities contained in the mobile station. Then the previously employed SIM card 101*a* to 101*d* is disconnected from the mobile station 103 by the associated switch 202*a* to 202*d*. A selected additional SIM card 101*a* to 101*d* is connected to the mobile station 103 by actuating the associated switch 202*a* to 202*d*. Preferably, a time period between the switching off of the mobile station 103 and the disconnection between a SIM card 101*a* to 101*d* and the mobile station 103 is provided that is sufficiently long to allow the execution of the switching-off procedure for securely switching off the SIM card 101*a* to 101*d*. Once the new SIM card 101*a* to 101*d* has been connected to the mobile station 103, the mobile station 103 is once again switched on by the switching device 109. After being switched on, the mobile station 103 can sign in to a mobile telephony network 102 by making use of the new SIM card 101*a* to 101*d*. The switches 202*a* to 202*d* for disconnecting and establishing the connections between the mobile station 103 and the SIM cards 101*a* to 101*d*, as already described above, are actuated by the controller 107.

In one embodiment, a routine for executing the above-mentioned change of a SIM card 101*a* to 101*d*, which especially lays down the above-mentioned sequence of switching procedures as well as the time between the switching off of the mobile station 103 and the switchover of the SIM card 101*a* to 101*d*, is implemented within the controller 107. In this case, the computer device 104 or another control panel merely sends control signals to the controller 107 and they initiate the change of the SIM card and specify the SIM card 101*a* to 101*d* that is to be used, that is to say, the SIM card 101*a* to 101*d* to which the switchover should be made. As an alternative, however, the routine can also be implemented in the computer device 104 or in an alternative control panel. If this is the case, the switches 202*a* to 202*d* and the switching device 109 are controlled via the controller 107 of the computer device 104 or of the alternative control panel.

As already described, the system 100 shown in FIG. 1 is especially suitable for performing tests of the service quality in one or more mobile telephony networks 102. Owing to its simple and compact structure, it can also be used for a portable test execution. In this case, quality testers move spatially and check, for example, the service quality that is made available by different mobile telephony networks 102 at various places. For this purpose, the computer device 104 is preferably configured as a notebook computer.

Figure 4A:
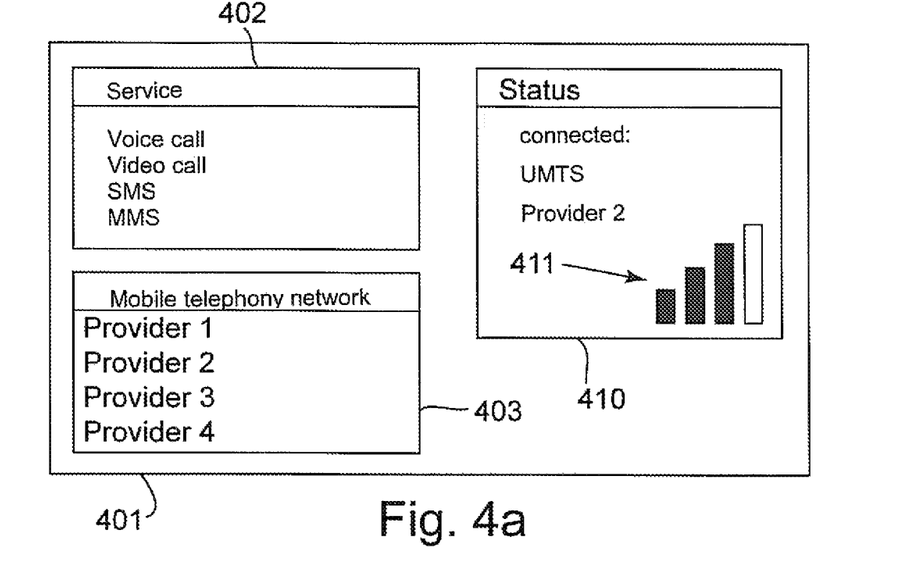
FIG. 4a is a diagram of a graphic user interface for controlling and/or monitoring a mobile station contained in a mobile telephony device.

In order to perform the tests of the service quality, appropriate software is preferably installed on the computer device 104 so that the tests can be controlled, monitored and/or evaluated. By way of an example, FIG. 4a shows part of a graphic user interface of the software that serves to execute and monitor a test sequence for the quality check of mobile telephony connections. The graphic user interface comprises a window 401 in which program functions for controlling the mobile station 103 can be selected. In particular, the user can select via buttons in an area 402 which communication service is to be used, e.g. a voice call, a video call, an SMS (Short Message Service) or MMS (Multimedia Messaging Service). In a second area 403, the user is offered different mobile telephony networks 102 that are operated by different operators (providers) and that can be selected via buttons. Moreover, in the depicted embodiment, the status of the mobile station 103 is displayed to the user in an area 410. The depiction selected in FIG. 4a by way of an example shows, for example, that a UMTS connection exists via the mobile telephony networks 102 of the operator provider 2. The receiving strength is displayed with reference to a graph 411. The mobile station 103 for executing test programs can be controlled manually via the graphic user interface. By the same token, however, it is also possible for the above-defined test programs to be carried out automatically.

Figure 4B:
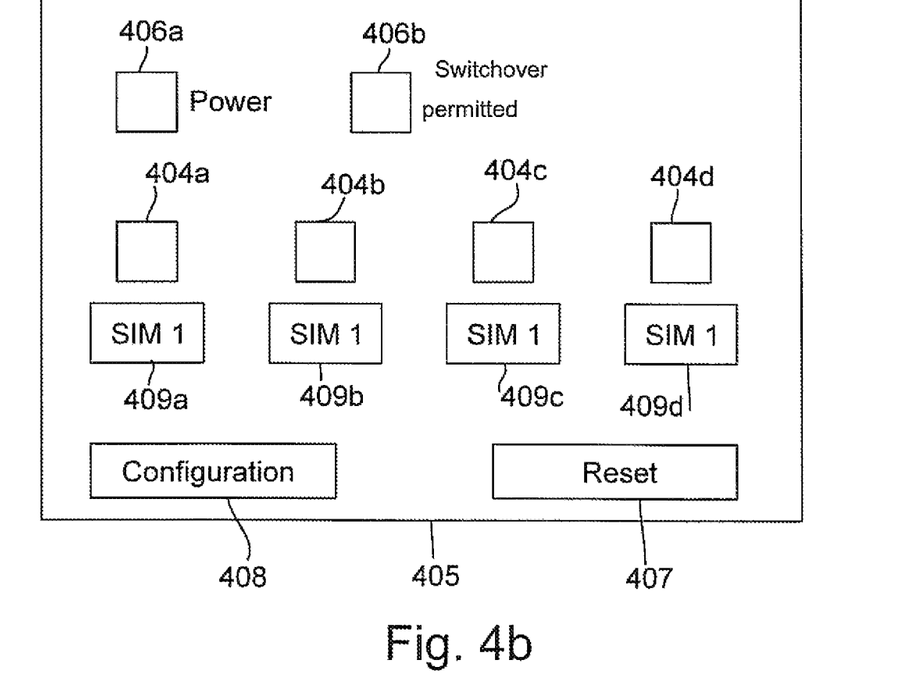
FIG. 4b a diagram of a graphic user interface for controlling and/or monitoring the multiplexer.

FIG. 4b shows a graphic user interface of a control application for controlling the multiplexer 106. In a window 405, the switching state of the switches 202a to 202d is shown on the basis of control fields 404a to 404d, which are each associated with a switch 202a to 202d. This shows which SIM card 101a to 101d that is inserted into the multiplexer 106 is currently connected to the mobile station 103. On the basis of the controls fields 406a,b, the switching state of the switching unit 109 is depicted which indicates whether the mobile station 103 is switched on or off (control field 406a), and whether a change of the SIM card 101a to 101d is currently possible (control field 406b). Moreover, each SIM card 101a to 101d or each switch 202a to 202d is associated with a button 409a to 409d within the graphic user interface. Clicking on the button 409a to 409d for the selection of a certain SIM card 101a to 101d leads to the switchover to the selected SIM card 101a to 101d. The change of SIM cards 101a to 101d, however, can also be controlled automatically by the control application, for example, in order to carry out previously defined test programs. Here, the display in the window 405 serves primarily to inform the user about the switching states but it also allows the user to intervene manually if this should be necessary. For example, on a button 407, the user can also switch off all of the relays for testing purposes. It is also possible to use the button 408 to select a function with which the configuration of the switching connections can be changed.

Although exemplary embodiments of the invention are described in detail in the drawings and in the presentation above, the presentations are to be understood as illustrations or examples, and are not to be construed in a limiting manner; in particular, exemplary embodiments of the invention are not limited to the explained embodiments. Additional exemplary embodiments of the invention and their execution ensue for the person skilled in the art from the preceding disclosure, the figures and the claims.

The terms employed in the claims such as "encompass", "comprise", "have", "contain" and the like do not rule out additional elements or steps. The use of the indefinite article does not rule out the plural. An individual device can perform the functions of several of the units or devices specified in the claims.

The reference numerals indicated in the claims are not to be construed as limitations of the structure and steps employed.

What is claimed is:

1. A mobile telephony device for testing the service quality of different mobile telephony networks, comprising:
a multiplexer that holds several subscriber identity module (SIM) cards and that can be connected to a mobile station, wherein the multiplexer is a separate device with a housing and a connection piece, wherein the connection piece can be inserted into a SIM card holder of the mobile station, the multiplexer, comprising:
the housing,
a first switching component that is configured such that each one of the SIM cards can be connected to the mobile station;
a controller connected to a second switching component for switching on and off the mobile station, wherein the controller is arranged in the housing of the multiplexer; and
the second switching component configured to switch off the mobile station with a switch-off procedure initiated through actuation via the controller before one SIM card is being disconnected from the mobile station and another one of the SIM cards is being connected to the mobile station; and
the mobile station that can be connected to a mobile telephony network by using one of the SIM cards.

2. The mobile telephony device recited in claim 1, the mobile station and the SIM cards being configured in such a way that, owing to the switching off of the mobile station, a switch-off routine is executed that ensures that the SIM card connected to the mobile station is securely switched off.

3. The mobile telephony device recited in claim 1, the mobile station having a card holder suitable to hold a SIM card, and the multiplexer having a connection piece that can be inserted into the card holder, whereby the SIM cards can each be connected to the connection piece via a first switching component.

4. The mobile telephony device recited in claim 3, whereby the connection piece has the external dimensions of a SIM card, the connection piece having contact surfaces that are arranged like contact surfaces on a SIM card.

5. The mobile telephony device recited in claim 1, comprising a control unit that is configured to disconnect the connection between a SIM card and the mobile station through the first switching component that is associated with the SIM card after the mobile station has been switched off through the second switching component.

6. The mobile telephony device recited in claim 5, whereby a programmable time interval passes between the point in time when the mobile station is switched off and the point in time when the connection between the SIM card and the mobile station is disconnected.

7. The mobile telephony device recited in claim 5, whereby the control unit is configured to switch on the mobile station through the second switching component after a SIM card has been connected to the mobile station through the associated first switching component.

8. The mobile telephony device recited in claim 5, comprising a first interface for receiving control signals for influencing the control unit.

9. The mobile telephony device recited in claim 8, comprising a second interface for establishing a data connection to the mobile station.

10. The mobile telephony device recited in claim 9, whereby the first and/or the second interface is a USB interface.

11. A system for checking the service quality in more than one mobile telephony network, comprising:

a mobile station that can be connected to a mobile telephony network by using a SIM card;

a multiplexer that can be connected to the mobile station and that holds several SIM cards, the multiplexer, comprising:

a housing separate from the mobile station;

a first switching component that is configured such that each one of the SIM cards can be connected to the mobile station;

a connection piece, that can be inserted in a SIM card holder of the mobile station;

a controller connected to a second switching component for switching on and off the mobile station; and the second switching component configured to switch off the mobile station with a switch-off procedure initiated through actuation by means of the controller before one SIM card is being disconnected from the mobile station and another one of the SIM cards is being connected to the mobile station;

a computer device that is connected to the controller of the multiplexer and to mobile telephony device and that is configured to access a service of the mobile telephony network via the mobile station; and wherein the computer device contains one or more applications for controlling and evaluating the checking of the service quality in the telephony network.

12. The system recited in claim 11, whereby the computer device is connected via the first interface of the mobile telephony device to the control unit of the mobile telephony device and it is configured to trigger a switchover from one SIM card to another SIM card on the basis of a control command.

13. A method of operating a mobile telephony device, the method comprising:

connecting a mobile station to a mobile telephony network by using a SIM card;

connecting a multiplexer to the mobile station, the multiplexer holding several SIM cards, the multiplexer comprising: a housing separate from the mobile station; a connection piece that can be inserted in a SIM card holder of the mobile station; a controller connected to a second switching component for switching on and off the mobile station; a first switching component; and a second switching component;

configuring the first switching component such that each one of the SIM cards can be connected to the mobile station; and configuring the second switching component to switch off the mobile station while one SIM card is being disconnected from the mobile station and another SIM card is being connected to the mobile station.

* * * * *